(12) United States Patent
Yamasaki

(10) Patent No.: US 8,270,305 B2
(45) Date of Patent: Sep. 18, 2012

(54) NODE DEVICE, NODE SYSTEM, AND METHOD AND PROGRAM FOR CHANGING STATISTIC INFORMATION MANAGEMENT TABLE USED FOR THE NODE DEVICE

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 518 days.

(21) Appl. No.: 12/529,869

(22) PCT Filed: Mar. 5, 2008

(86) PCT No.: PCT/JP2008/053951
§ 371 (c)(1),
(2), (4) Date: Sep. 3, 2009

(87) PCT Pub. No.: WO2008/108403
PCT Pub. Date: Sep. 12, 2008

(65) Prior Publication Data
US 2010/0027436 A1    Feb. 4, 2010

(30) Foreign Application Priority Data

Mar. 6, 2007   (JP) ................................ 2007-055787

(51) Int. Cl.
*H04J 3/14* (2006.01)
(52) U.S. Cl. ..................................................... 370/241
(58) Field of Classification Search ........................ None
See application file for complete search history.

(56) References Cited

U.S. PATENT DOCUMENTS
2002/0131432 A1*  9/2002  Bachmutsky et al. ........ 370/408

FOREIGN PATENT DOCUMENTS
JP       2006-254134 A     9/2006

OTHER PUBLICATIONS

International Search Report for PCT/JP2008/053951 mailed Apr. 1, 2008.
B. Claise, "Cisco NetFlowServices Export Version 9", IETF, RFC3954, Oct. 2004.
R. Hayashi, et al., "Network QoS Control Mechanism by Real-Time Measurement of Elephant Flows", IEICE Technical Report (NS2005-117, CQ2005-71, TM2005-11), Nov. 2005, pp. 37-40.

* cited by examiner

*Primary Examiner* — Kevin C Harper

(57) ABSTRACT

To provide a node device improving the measurement accuracy of the network communication quality and creating a smaller table for managing statistics information on the communication quality. An importance degree judging section determines the importance degree of a flow by referencing data for judging the degree of importance in the Z-list. An E-list stores statistics data on a flow having a high degree of importance of monitoring. A change judging section makes a judgment on change according to the importance degree of the flow and the importance degree in the E-list. An integral quality calculating section totalizes the qualities of the normal packet information that was measured in a normal packet quality measuring section and the statistics information that was measured in a statistics information quality measuring section and records the total in a quality result section.

16 Claims, 12 Drawing Sheets

NODE DEVICE, NODE SYSTEM, AND METHOD AND PROGRAM FOR CHANGING STATISTIC INFORMATION MANAGEMENT TABLE USED FOR THE NODE DEVICE

The present application is the National Phase of PCT/JP2008/053951 filed on Mar. 5, 2008, which claims priority based on Japanese Patent Application No. 2007-055787 filed on Mar. 6, 2007, disclosure of which is incorporated herein in its entirety.

TECHNICAL FIELD

The present invention relates to a node apparatus, and a method of swapping in a statistic information management table for use in the node apparatus, and particularly, to a node apparatus, and a method of swapping in a statistic information management table for use in the node apparatus suitably used in measuring communication quality of a network and taking traffic control based on a result of the measurement.

BACKGROUND ART

Apparatuses for measuring communication quality of a network and node apparatuses for taking traffic control based on a result of the measurement are sometimes provided therein with a table for managing statistic information on communication quality, based on which processing of traffic control thereafter is determined.

A conventional technique of this type is disclosed in Non-patent Document 1, for example.

NetFlow disclosed in Non-patent Document 1 (RFC3954 of Internet Engineering Task Force) describes a technique for creating statistic information in a node apparatus to measure quality of a network. Specifically, NetFlow is a mechanism provided in a router or a measuring probe for measuring quality of a network, and has the following functions (1), (2), (3):

(1) a function of capturing some or all of packets passing through an interface of a router;

(2) a function of updating statistic information present in the router from the captured packets; and (3) a function of creating packets at regular periods from a result of the statistic information in conformity with the format of NetFlow stipulated by RFC3954 or the like, and sending them to a data analysis apparatus.

By these functions, the data analysis apparatus collects information for packets passing through a router having the NetFlow mechanism to monitor quality of a network (mainly, the amount of traffic). For the function (2), a table provided in the data analysis apparatus is used to record statistic information such that one entry contains one flow, and update the statistic information. Since the number of entries is limited, the entry information should be swapped in turn in order to operate the apparatus over a long period of time. Methods therefor generally include: an inactive timer for deleting an entry of flow when communication having information representing the flow is not encountered over a certain period of time; an active timer for sending entry information to a data analysis apparatus or deleting it at regular periods even when communication continues; a method of deleting an entry when communication is completed by checking flag information such as "FIN" or "RST" of TCP (Transmission Control Protocol); an FIFO (First In First Out) scheme in which an entry registered earlier is precedently deleted when a cache becomes full; and an LIFO (Last In First Out) scheme in which an entry registered latest is precedently deleted, although depending upon the application.

A network quality control technique disclosed in Non-patent Document 2 is a technique for an apparatus for creating statistic information in the apparatus and taking traffic control based on a result thereof.

Specifically, the apparatus is for traffic transfer/control such as, for example, a router, and has the following functions (1), (2), (3), (4):

(1) determining an output route for an input packet;

(2) updating statistic information present in the apparatus based on the input packet;

(3) determining discardability of the input packet based on the statistic information; and (4) processing the packet based on results of (1) and (3) (either transferring the packet to the output route or discarding the packet).

This apparatus is provided with a table for recording therein statistic information such that one entry contains one flow; however, since an enormous amount of entries would be required when statistic information for all flows are managed, packet sampling is applied to reduce the amount of packets to be observed, and statistic information for flows are created based on the reduced amount of packets.

Non-patent Document 1: B. Claise, "Cisco Systems NetFlow Services Export Version 9," IETF, RFC3954, October 2004.

Non-patent Document 2: Rie HAYASHI, Takashi MIYAMURA, Kohei SHIOMOTO, Shigeo URUSHIDANI, "Network QoS control mechanism by real-time measurement of elephant flows," IEICE Technical Report (NS2005-117, CQ2005-71, TM2005-11), November 2005.

DISCLOSURE OF THE INVENTION

Problems to be Solved by the Invention

The conventional techniques, however, pose problems as follows:

Specifically, in NetFlow disclosed in Non-patent Document 1, basically all flows are registered into a table, and since entry swapping frequently occurs for a table with smaller size relative to the number of incoming flows, a period of time from first registration of information into the table to deletion thereof may be shortened and statistic information over only a short period of time may be compiled. As such, there arise problems that the processing load on the data analysis apparatus may be increased and measurement accuracy may be degraded. Moreover, NetFlow handles all flows with equal monitoring importance degree. Thus, the size of the table for managing statistic information should be increased to prevent frequent entry swapping, but realization thereof is not easy.

According to the apparatus for traffic control disclosed in Non-patent Document 2, it is possible to reduce the number of packets to be monitored by packet sampling, but since all of monitored flows should be kept in the table, flow information should have a somewhat large size. Moreover, similarly to NetFlow as described above, the apparatus handles all flows with equal monitoring importance degree. Thus, the size of the table should be increased, but realization thereof is not easy.

The present invention has been made in view of such circumstances as described above, and its object is to provide a node apparatus, and a method of swapping in a statistic information management table for use in the node apparatus, with which accuracy in measuring communication quality of a network is improved, and the size of a table for managing statistic information on the communication quality can be reduced.

Means for Solving the Problems

The present invention for solving the aforementioned problems is directed to a node apparatus for observing communication quality of a network, characterized in comprising: packet observing means for observing packets flowing through said network; packet classifying means for looking up a specific field in a packet observed by said packet observing means, and classifying said packet in accordance with a type of said field; monitoring importance degree calculating means for calculating a monitoring importance degree for each type of packets classified by said packet classifying means; and statistic information managing means provided with a statistic information management table for managing statistic information on communication quality of a network, for searching said statistic information, and in a case that said statistic information has been created, updating said statistic information, or in a case that said statistic information has not been created, deciding whether swapping should occur in said statistic information management table based on said monitoring importance degree.

The present invention for solving the aforementioned problems is also directed to a method of swapping in a statistic information management table for use in a node apparatus for observing communication quality of a network, the method being characterized in comprising: a packet observing step of observing packets flowing through said network; a packet classifying step of looking up a specific field in a packet observed by said packet observing processing, and classifying said packet in accordance with a type of said field; a monitoring importance degree calculating step of calculating a monitoring importance degree for each type of packets classified by said packet classifying processing; and a statistic information managing step of providing a statistic information management table for managing statistic information on communication quality of a network, searching said statistic information, and in a case that said statistic information has been created, updating said statistic information, or in a case that said statistic information has not been created, deciding whether swapping should occur in the statistic information management table based on said monitoring importance degree.

The present invention for solving the aforementioned problems is also directed to a communication system for observing communication quality of a network, characterized in comprising: packet observing means for observing packets flowing through said network; packet classifying means for looking up a specific field in a packet observed by said packet observing means, and classifying said packet in accordance with a type of said field; monitoring importance degree calculating means for calculating a monitoring importance degree for each type of packets classified by said packet classifying means; and statistic information managing means provided with a statistic information management table for managing statistic information on communication quality of a network, for searching said statistic information, and in a case that said statistic information has been created, updating said statistic information, or in a case that said statistic information has not been created, deciding whether swapping should occur in said statistic information management table based on said monitoring importance degree.

The present invention for solving the aforementioned problems is also directed to a program for a node apparatus for observing communication quality of a network, the program being characterized in causing said node apparatus to execute: packet observation processing of observing packets flowing through said network; packet classification processing of looking up a specific field in a packet observed by said packet observation processing, and classifying said packet in accordance with a type of said field; monitoring importance degree calculation processing of calculating a monitoring importance degree for each type of packets classified by said packet classification processing; and statistic information management processing of providing a statistic information management table for managing statistic information on communication quality of a network, searching said statistic information, and in a case that said statistic information has been created, updating said statistic information, or in a case that said statistic information has not been created, deciding whether swapping should occur in the statistic information management table based on said monitoring importance degree.

Effects of the Invention

According to the present invention, packets flowing through a network are observed, a specific field in an observed packet is looked up and the packet is classified in accordance with a type of the field, and a monitoring importance degree is calculated for each type of classified packets. Then, statistic information on the communication quality is searched, and in a case that the statistic information has been created, the statistic information is updated, or in a case that the statistic information has not been created, decision is made as to whether swapping should be occur in the statistic information management table based on the monitoring importance degree. Thus, accuracy in measuring communication quality can be improved without increasing the size of the statistic information management table.

EXPLANATION OF SYMBOLS

Figure 1:
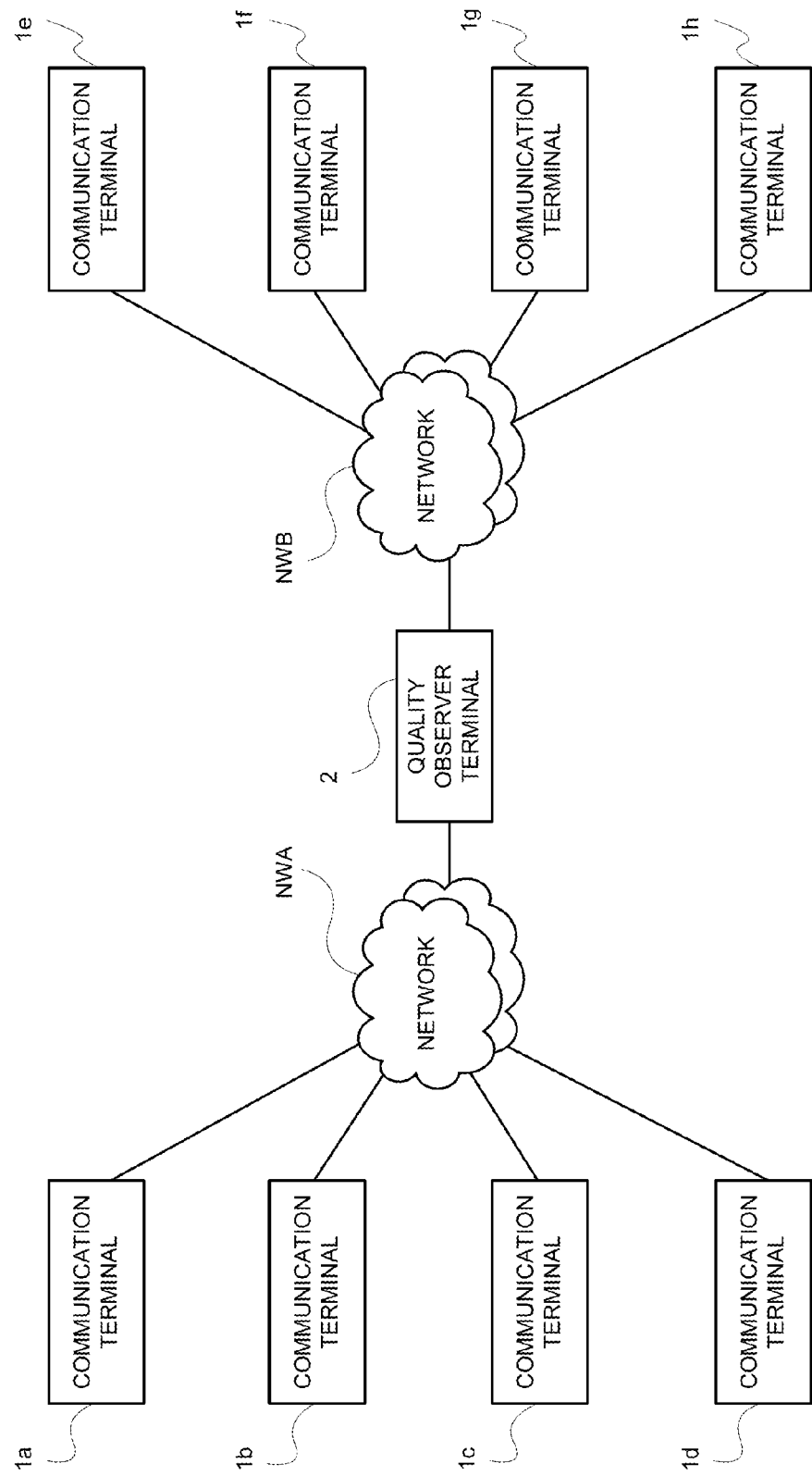
FIG. 1 A schematic diagram showing an environment in which a node apparatus of the present invention is employed.

NWA, NWB Network
2 Quality observer terminal (the node apparatus)
200 Packet transferring section (the packet observing means, packet classifying means)
210 Importance degree calculating section (the monitoring importance degree calculating means)
211 Search section (part of the importance degree calculating section)
212 Z-list (part of the importance degree calculating section)
213 Importance degree determining section (part of the importance degree calculating section)
220 Statistic information managing section (statistic information managing means)
221 Swapping deciding section
222 E-list
230 Quality measuring section
231 Distributing section
232 Statistic information quality measuring section
233 Normal packet quality measuring section
234 Combined quality calculating section
235 Resultant quality
240 Statistic information managing section (the statistic information managing means)
241 Search section
242 EZ-list
243 Swapping deciding section
244 Swapping probability
250 Statistics management/discardability decision processing (the statistic information managing means)
251 Swapping deciding section
252 E-list
253 Discardability decision processing
261, 262 Packet discard

BEST MODES FOR CARRYING OUT THE INVENTION

There are provided a node apparatus for, using the fact that the traffic distribution in a network is not uniform, defining a higher importance degree for an item desired to be concentratedly managed, using a table in the node apparatus based on the importance degree, acquiring detailed traffic statistic information focusing on flows having a higher importance degree, and making decision of packet discardability based on the amount of traffic information, and a method of swapping in a statistic information management table for use in the node apparatus.

Now a first embodiment of the present invention will be described hereinbelow.

FIG. 1 is a schematic diagram showing an environment in which a node apparatus of the present invention is used.

In the environment, for example, communication terminals 1a, 1b, 1c and 1d, such as personal computers, are connected to a network NWA, to which a quality observer terminal 2 is connected as a node apparatus. The quality observer terminal 2 is connected to a network NWB, to which communication terminals 1e, 1f, 1g and 1h are connected. The quality observer terminal 2 is inserted in a communication path between the networks NWA and NWB to measure transmitted packets flowing through the communication path. In this embodiment, a method of swapping in a statistic information management table provided in the quality observer terminal 2 for managing statistic information on communication quality will be described hereinbelow. Specifically, based on a history of incoming packets, an observation importance degree for a group of packets having the same value in a specific field is determined, and based on a result of the observation importance degree, a group of packets for which statistic information should be managed in the statistic information management table in the quality observer terminal 2 is determined.

Figure 2:
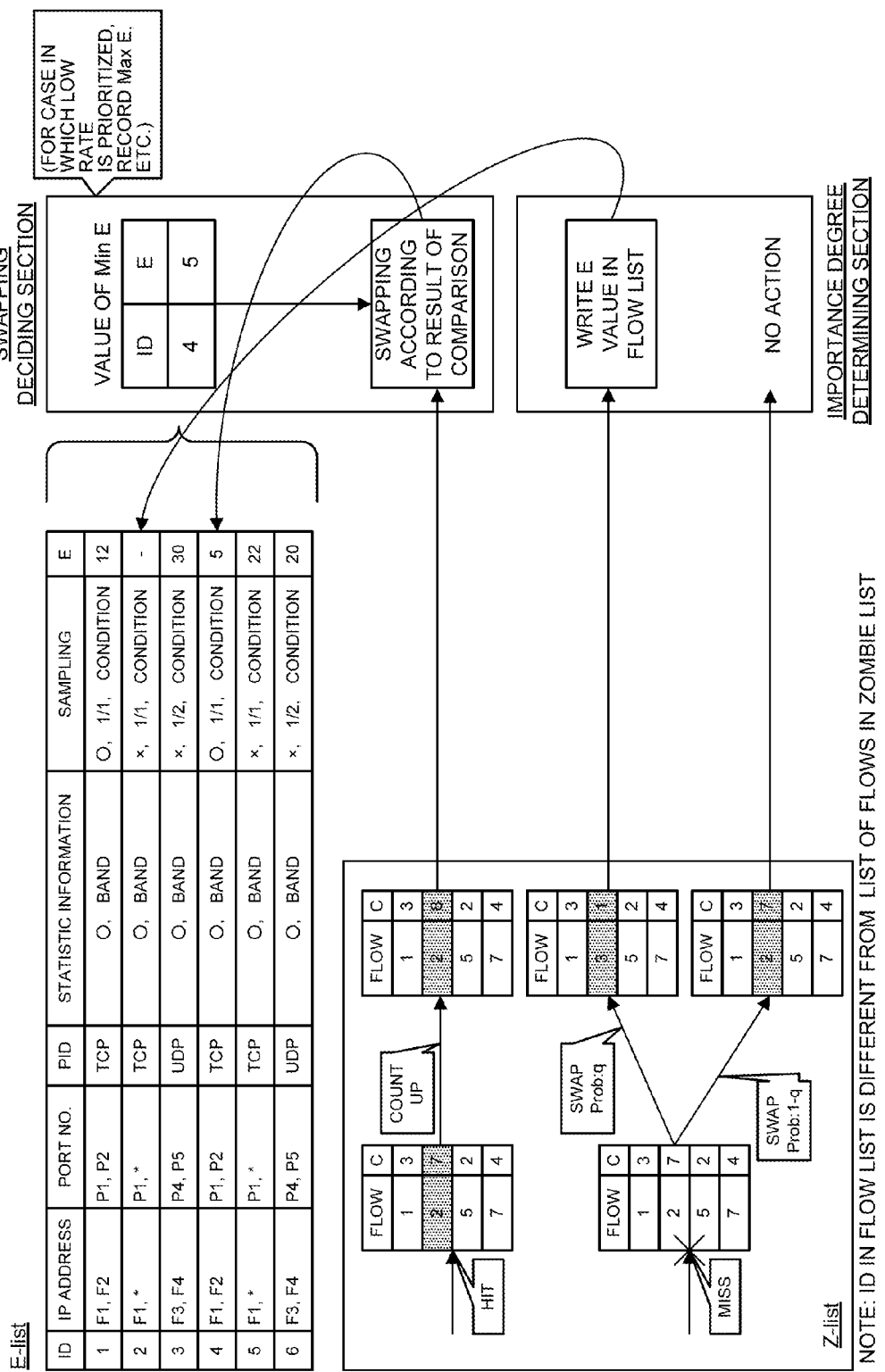
FIG. 2 A diagram showing an overview of registration processing for an E-list and a Z-list for use in a quality observer terminal 2 representing a first embodiment of the present invention.
Figure 3:
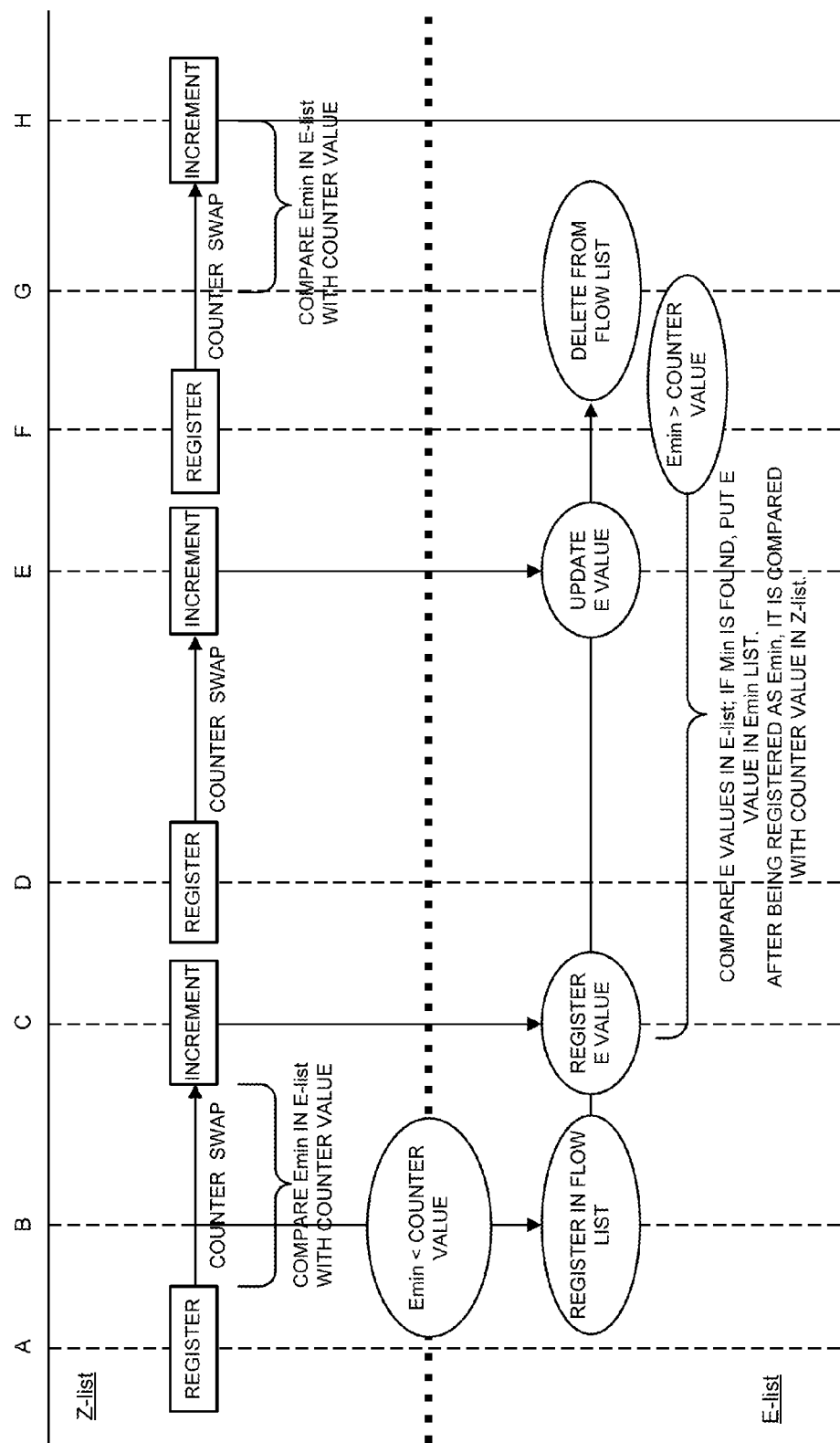
FIG. 3 A diagram showing an overview of registration processing for the E-list and Z-list for use in the quality observer terminal 2 representing the first embodiment of the present invention.

FIGS. 2 and 3 are diagrams of showing an overview of registration processing for an E-list and a Z-list for use in the quality observer terminal 2 representing the first embodiment of the present invention. In FIGS. 2 and 3, a list with which an observation importance degree is determined for a group of packets having the same value in a specific field is shown in the Z-list, and a list with which statistic information is monitored in the quality observer terminal 2 is shown in the E-list.

Figure 4:
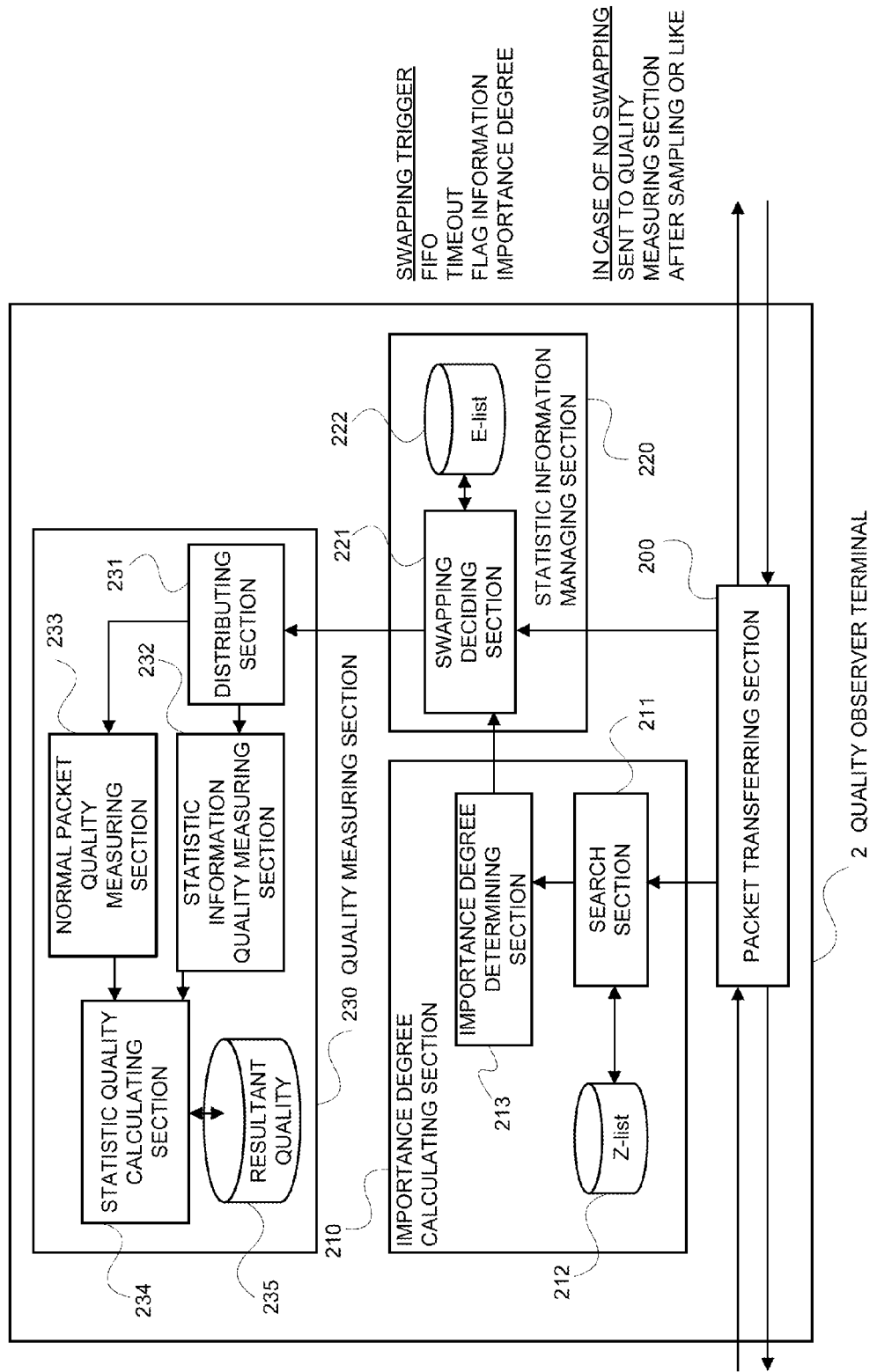
FIG. 4 A block diagram showing a configuration of the quality observer terminal 2 in FIG. 1.

FIG. 4 is a block diagram showing a configuration of the quality observer terminal 2 in FIG. 1.

In the present embodiment, a group of packets having the same value in a specific field will be referred to as "flow." A specific example of the flow may include a group of packets grouped with reference to one of a transmitting/receiving IP address, a transmitting/receiving port number, a transmitting/receiving MAC address, and a protocol ID, or a combination thereof. Alternatively, packets may be grouped with reference to classification by flag information present in a protocol header according to a protocol such as IP (Internet Protocol) or TCP or priority information present in a protocol header according to a protocol such as IP, VLAN (Virtual Local Area Network) or MPLS (Multi Protocol Label Switching), or packets may be grouped with reference to a combination of the foregoing. It may also be contemplated that a method of classification involves using completely identical numbers or types, or defining a plurality of ranges and classifying those falling within a defined range as the same group.

The quality observer terminal 2 is comprised of a packet transferring section 200, an importance degree calculating section 210, a statistic information managing section 220, and a quality measuring section 230. The importance degree calculating section 210 is comprised of a search section 211, a Z-list 212 containing data for determining an importance degree, and an importance degree determining section 213 for determining an importance degree of a current flow from a result of the Z-list 212. The statistic information managing section 220 is comprised of a swapping deciding section 221 for deciding swapping on the basis of the importance degree of a current flow and that in an E-list 222, and an E-list 222 in which statistic data for flows having a higher monitoring importance degree are stored. The quality measuring section 230 is comprised of a distributing section 231 for distributing data sent by the statistic information managing section 220 to several processing sections with reference to the packet information and statistic information, a statistic information quality measuring section 232 for measuring quality of a portion conveyed in the statistic information, a normal packet quality measuring section 233 for measuring quality of a portion conveyed in the packet information, a combined quality calculating section 234 for combining quality of a normal packet with that in the statistic information, and a resultant quality 235 in which quality information calculated there is recorded.

The packet transferring section 200 performs processing of observing an incoming packet via an input port into the quality observer terminal 2, then, sending a result thereof to the importance degree calculating section 210 and statistic information managing section 220, and at the same time, transferring the result via an output port on the other side into the network. The processing is performed each time a packet is input. It should be noted that packets may be sampled and decimated at the packet transferring section 200 and a reduced number of packets may be transferred to the importance degree calculating section 210 and statistic information managing section 220.

The importance degree calculating section 210 performs processing at the search section 211 based on the packet information sent by the packet transferring section 200. The search section 211 performs a search on the Z-list 212. The Z-list 212 is a list having an ID and a counter value C, and has a parameter representing a swapping probability q of the entries. The ID is determined using flow information. In a case that the ID of a flow is found in the Z-list 212, a counter value C of the corresponding ID is incremented by one. In a case that the ID of the flow is not found in the Z-list 212, an ID in the Z-list 212 is randomly selected to generate a random number, and then, in a case that a result of random number generation is lower than the swapping probability q, an entry having the selected ID is dislodged from the Z-list 212, the packet that has currently arrived is registered in an entry, and a counter value of one is selected. In a case that the result of random number generation is greater than the swapping probability q, no processing is applied to the Z-list 212.

Once swapping has occurred, rate estimation as given by EQ. (1) below is performed. In EQ. (1), p designates an average hit rate in the Z-list 212, q designates a swapping probability for the Z-list 212, Ci designates a counter value C assigned to a flow that was dislodged when swapping occurred, and M designates the size of entries. Thus, calculation of the rate according to EQ. (1) is performed when a packet in another flow, rather than that in the same flow, arrives.

$$Ri = (1-p) \cdot (q/M) \cdot (Ci-1) \qquad (1)$$

A case in which the counter in the Z-list 212 is incremented corresponds to a time lying between time A and time C, between time D and time E or between time F and time H as shown in FIG. 3. Which of them a case is classified into is determined by the status of the E-list 222. A case in which no increment occurs in the Z-list 212 and entry swapping occurs corresponds to a time of any one of moments A, C, D, E, F, or H. The importance degree determining section 213 determines an importance degree F. based on the value in the Z-list 212. There are various methods for determining the importance degree F. When a monitoring priority of a flow having a higher rate is to be increased, the result of Ri from EQ. (1) is defined as the priority.

The statistic information managing section 220 is supplied as an input with the packet information from the packet transferring section 200 and the importance degree calculated at the importance degree calculating section 210. The swapping deciding section determines processing based on the contents in the E-list 222, a result of the importance degree determining section 213, and the packet information from the packet transferring section 200. The E-list 222 is a list having a flow ID, an importance degree E-value, and statistic information (such as the amount of traffic, packet loss count, flag counts) forming a set. The swapping deciding section 221 stores therein a flow ID that has the lowest importance degree in the E-list 222 and its importance degree E-value. The lowest importance degree E-value that is stored will be referred to as "Emin" hereinbelow. In a case that a packet from the packet transferring section 200 belongs to a flow not registered in the E-list 222 and also not registered in the Z-list 212, the packet information is sent to the quality measuring section 230 without applying any action. At that time, packets may be sampled and sent at a certain probability. This corresponds to a time before time A or a time after time H in the timing chart of FIG. 3.

In a case that a packet from the packet transferring section 200 belongs to a flow not registered in the E-list 222 but registered in the Z-list 212, the priority F in the Z-list 212 after increment is compared with the value of Emin, and in a case that the priority F is greater than Emin, information on the flow having Emin is deleted from the E-list 222 (which corresponds to time G in FIG. 3 as viewed from the flow to be deleted), and the registered importance degree E and statistic information are sent to the quality measuring section 230. Then, the entry for the current flow is registered in the E-list 222 (which corresponds to time B in FIG. 3 as viewed from the flow to be newly registered). In registering an entry, the flow information for the group is registered in the flow ID, the importance degree E-value is blank, and the statistic information is cleared (the amount of traffic, packet loss count, flag counts, etc. are set to zero). In a case that the priority F is lower than Emin, the packet information is sent to the quality measuring section 230 without modifying the E-list 222 (which corresponds to a time between time A and time B or between time G and time H in FIG. 3).

In a case that a packet from the packet transferring section 200 belongs to a flow registered in the E-list 222 but not registered in the Z-list 212, and when no swapping occurs in the Z-list 212 according to a result from the search section 211, the registered statistic information in the E-list 222 is updated (which corresponds to a time between time C and time D, or between time E and time F in FIG. 3). When swapping has occurred in the Z-list 212 according to a result from the search section 211, statistic information for the flow to which the packet under processing belongs is updated (which corresponds to time D or time F in FIG. 3), and at the same time, decision of processing for the flow dislodged by swapping in the Z-list 212 is made. In a case that the dislodged flow is also found in the E-list 222, the counter value C at the time of dislodgment from the Z-list 212 is used to calculate a final importance degree F., and this information is written as an importance degree E in the statistic information in the E-list 222 (which corresponds to time C and time E in FIG. 3). In a case that the flow dislodged from the Z-list 212 is not found in the E-list 222, no processing is applied. In a case that a packet from the packet transferring section 200 belongs to a flow registered in the E-list 222 and also registered in the Z-list 212, the Z-list 212 is updated, and at the same time, the E-list 222 is updated (which corresponds to a time between time B and time C, between time D and time E, or between time F and time G in FIG. 3).

The quality measuring section 230 classifies the information from the statistic information managing section 220 at the distributing section 231, and when packet information arrives, distributes it to the normal packet quality measuring section 233, or when the statistic information arrives, distributes it to the statistic information quality measuring section 232. The normal packet quality measuring section 233 measures quality (the amount of traffic, etc.) at an appropriate position from the sent packet information, and sends a result thereof to the combined quality calculating section 234. The statistic information quality measuring section 232 measures quality (the amount of traffic, packet loss, etc.) at an appropriate position from the sent statistic information, and sends a result thereof to the combined quality measuring section 234. The combined quality calculating section 234 combines the result of the normal packet quality measuring section 233 with that of the statistic information quality calculating section 232 to calculate one piece of quality information, and records the result into the resultant quality 235.

Figure 6:
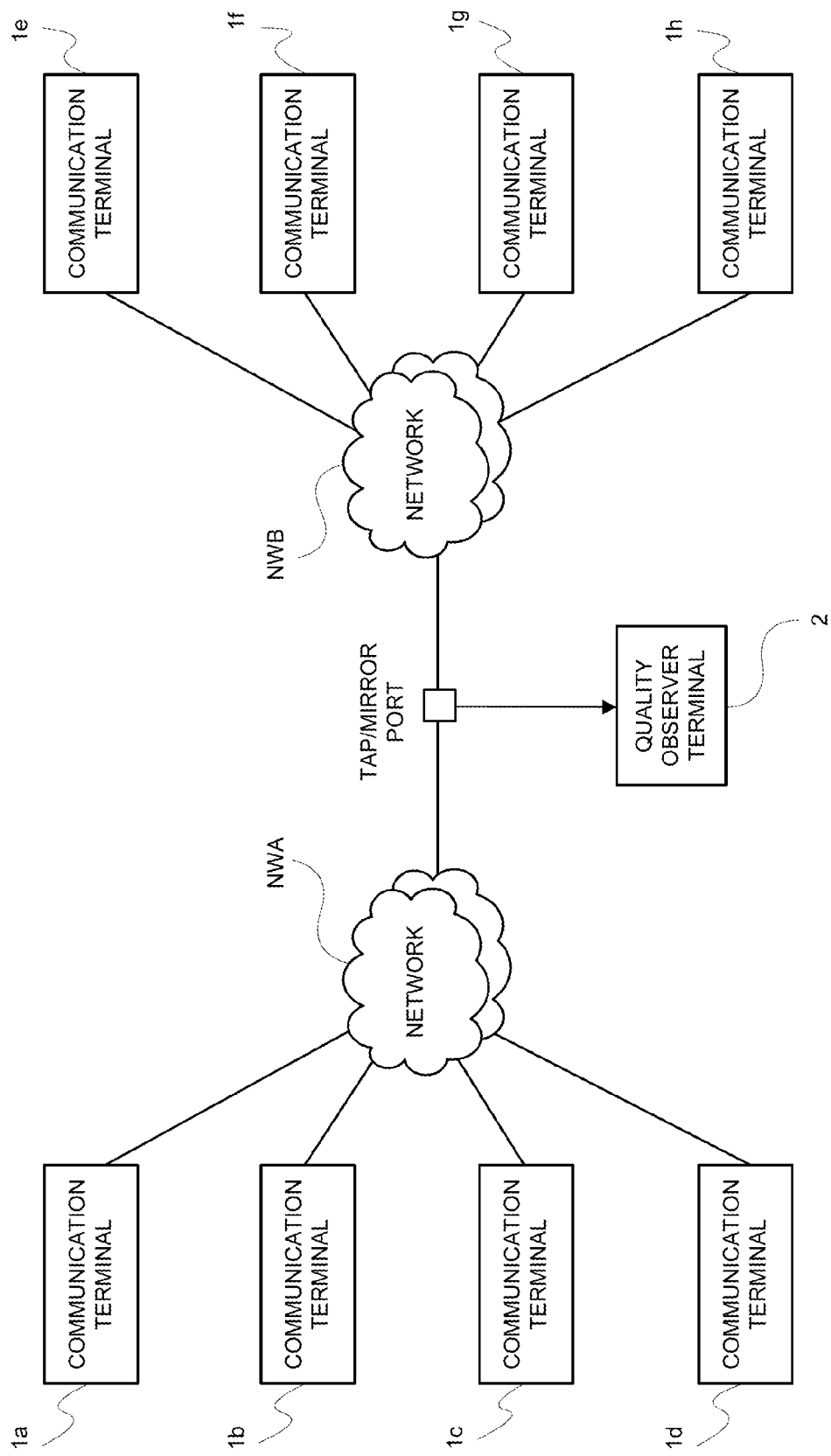
FIG. 6 A schematic diagram showing another environment in which the node apparatus of the present invention is used.

While the present embodiment is described as being used in the environment as shown in FIG. 1 because description is made on a configuration in which the quality observer terminal 2 is inserted in a line in a network, it is possible to implement a configuration as shown in FIG. 6 in which a TAP (terminal adapter) for copying packets is inserted into a network, or a configuration in which packets are observed by setting a mirror port function of copying packets at a router or a port serving as a switch. In this case, the packet transferring section 200 in FIG. 4 has a function of receiving packets from the outside of the quality observer terminal 2. Moreover, while the importance degree calculating section 210, statistic information managing section 220, and quality measuring section 230 are all provided in one apparatus represented by the quality observer terminal 2, they may be disposed in separate apparatuses, in which case information transmission among several sections is achieved via a network.

Moreover, while information that is not counted in the E-list at the swapping deciding section 221 is described as being sent to the quality measuring section 230 as packet information, only information that is registered in the E-list and that is important may be sent as statistic information. Furthermore, while information measured in the quality measuring section 230 is described as the amount of traffic or packet loss, and grouping of flows may be made by, for example, classifying flows according to the number in TCP flag information generated in a certain IP address group to collect information on security, quality information to be calculated is not limited to the amount of traffic. In addition, while packet information observed in the packet transferring section 200 is described as being sent simultaneously to the importance degree calculating section 210 and statistic information managing section 220, it may be sent to the importance degree calculating section 210, and the packet information per se may be sent along with an importance degree of the flow from the importance degree calculating section 210 to the statistic information managing section 220.

Moreover, while a flow with a higher rate is given a higher priority, a method of defining a reciprocal of the result of Ri in EQ. (1) as a priority may be contemplated for increasing the priority of a flow with a lower rate. Further, to observe a specific rate, a method involving setting a baseline rate Rb, taking a difference between calculated R and Rb, and defining a reciprocal thereof as a priority may be contemplated. Furthermore, while the calculation of a priority is made based on a value of Ri serving as a rate, the priority may be defined similarly but based on a counter value C. In addition, while the time at which flow information is registered in the E-list 222 is described as being defined by calculating an importance degree from the C value during an increment operation for the Z-list 212 and comparing the result with Emin, modification may be made so that the time is defined by dislodging flow information from the Z-list 212, and then comparing a final counter value C or an importance degree F. with Emin. In this case, statistic information is cleared because packets in a newly registered flow upon entry swapping in the E-list 222 are different from those in a flow under processing. Since a final importance degree is fixed for the importance degree E at the time of dislodgment from the Z-list 212, its value is recorded.

While flow swapping is described with reference to a case in which packet observation is performed at the packet transferring section 200, a method of activating an active timer (operating at regular intervals even information is updated) or an inactive timer (operating after a certain period of time from the time at which update of information is stopped) for each entry of statistic information in the E-list 222, and sending the statistic information to the quality measuring section 230 may be contemplated. At that time, a method of sending information and deleting it from the E-list 222, or a method of sending information without deleting it may be contemplated. In a case that information is deleted from the E-list 222, it may be contemplated that an importance degree is set as a low value, such as, for example, zero, so that a next flow may immediately fill the entry.

Figure 5:
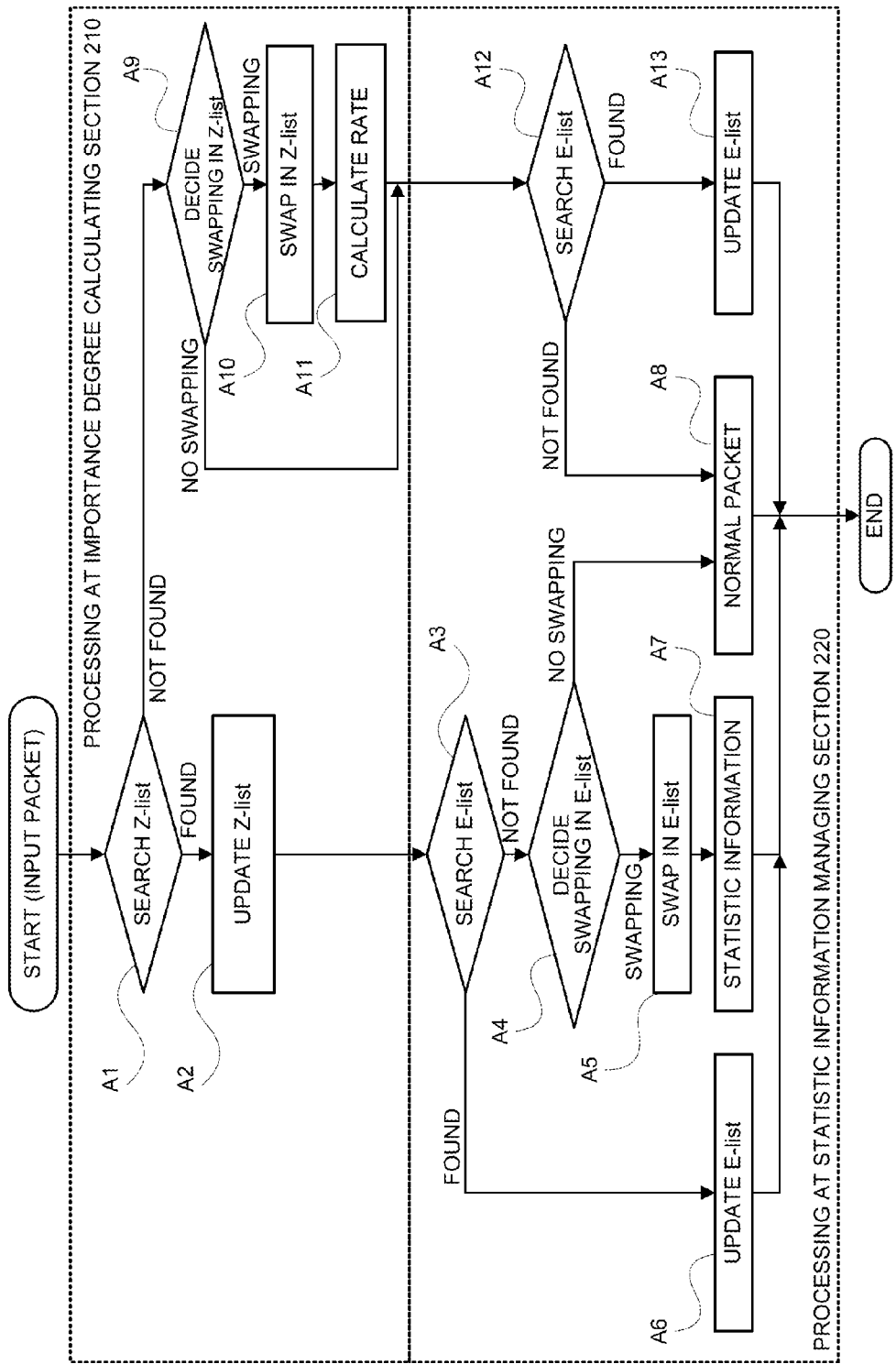
FIG. 5 A flow chart for explaining an operation of an importance degree calculating section 210 and a statistic information managing section 220 in the quality observer terminal 2.

FIG. 5 is a flow chart for explaining an operation of the importance degree calculating section 210 and statistic information managing section 220 in the quality observer terminal 2.

Processing of a method of swapping in a statistic information management table used in the quality observer terminal 2 in this example will be described hereinbelow with reference to FIG. 5.

According to the quality observer terminal 2, packets flowing through a network are observed (packet observation processing), a specific field in the packet observed by the packet observation processing is looked up, the packet is classified depending upon a type of the field (packet classification processing), and a monitoring importance degree is calculated for each type of the packets classified by the packet classification processing (monitoring importance degree calculation processing). Then, a statistic information management table is provided for managing statistic information on communication quality, statistic information is searched, and in a case that the statistic information has been created, the statistic information is updated, or in a case that the statistic information has not been created, a decision is made as to whether swapping should occur in the statistic information management table based on the monitoring importance degree (statistic information management processing).

Specifically, as soon as a packet arrives at the packet transferring section 200, its content is transferred to the search section 211 and the swapping deciding section 221 to start processing, and the process goes to Step A1. At Step A1, the search section 211 searches the Z-list 212 to check whether a flow for the packet under processing is registered in the Z-list 212. In a case that the flow is registered, the process goes to Step A2; otherwise, to Step A9. At Step A2, the Z-list 212 undergoes update processing. In particular, a counter value in the Z-list 212 is incremented by one. Then, the importance degree determining section 213 calculates a temporary importance degree F. for the flow whose counter is incremented (a final importance degree is determined when a corresponding flow is dislodged from the Z-list 212). After completion of the processing, the process goes to Step A3.

At Step A3, the swapping deciding section 221 searches the E-list 222 to check whether a flow to which the packet sent by the packet transferring section 200 belongs is found there. In a case that the flow is found in the E-list 222, the process goes to Step A6; otherwise, to Step A4. At Step A4, the value Emin that is the lowest importance degree in the E-list 222 is compared with the temporary importance degree F. for the flow whose counter is incremented in the Z-list 212 under updating. In a case that the importance degree F. is higher than Emin, swapping occurs in the E-list 222, and the process goes to Step A5. In a case that Emin is higher than the importance degree F., no swapping occurs, and the process goes to Step A8.

At Step A5, the flow associated with Emin is dislodged from the E-list 222, and an entry of the flow to which the packet under processing belongs is created. At that time, the statistic information is in a cleared state and the importance degree is left blank, and the process goes to Step A7. At Step A6, the managed statistic information is updated, including incrementing the amount of traffic in the E-list 222, checking a sequence number to detect the presence/absence of packet loss generation, flag information, etc., and the processing is terminated. At Step A7, information for the entry dislodged from the E-list 222 at Step A5 is sent to the quality measuring section 230, and the processing is terminated. At Step A8, the packet information sent by the packet transfer 220 to the swapping deciding section 221 is sent to the quality deciding section 230. At Step A9, swapping decision processing for the Z-list 212 is performed. In this case, a random number is generated for comparison with the swapping probability q present in the Z-list 212, and in a case that the swapping probability q is larger, swapping processing occurs and the process goes to Step A10, or in a case that the swapping probability q is lower, the process goes to Step A12.

At Step A10, swapping processing in the Z-list 212 is performed. In this case, an entry in the Z-list 212 is randomly selected and dislodged from the Z-list 212, and information belonging to the information for the packet under processing is written into the entry. The ID is written with that of a flow to which the packet under processing belongs, and the counter value C is recorded with one. Thereafter, the process goes to Step A11. At Step A11, the importance degree determining section 213 calculates a rate according to EQ. (1) from the counter value C of the flow for which swapping has occurred at Step A9, to calculate an importance degree F. for the flow based on a result thereof. In a case that the flow is found in the E-list 222, the importance degree F. for the flow is written to the importance degree E in the E-list 222. The process then goes to Step A12. At Step A12, the swapping deciding section 221 searches the E-list 222. When there is found the flow under processing, the process goes to Step A13; otherwise, to Step A8. At Step A13, since the flow under processing is found in the E-list 222, the managed statistic information is updated, including incrementing the amount of traffic, checking a sequence number to detect the presence/absence of packet loss generation, flag information, etc., and the processing is terminated. Thus, the processing is achieved in the quality observer terminal 2 as described above.

According to the conventional technique, no importance degree is defined for monitoring an entry managed in a table, or a flow, and entries or flows are equally managed. Thus, to monitor a network through which an enormous amount of flows flow, the amount of entries in the management table must be increased, leading to a problem that computational resources and memory size required to be provided in the apparatus grow large. On the contrary, when the amount of entries in the management table is decreased, there arises a problem that information managed in the statistic information is fragmented to reduce measurement accuracy.

According to the present embodiment, an entry managed in a table, or a flow, is given an importance degree for monitoring. According to the present embodiment, a throughput stochastically calculated using a small table is defined as the monitoring importance degree. Since swapping occurs in the table based on the importance degree, statistic information for those having a higher importance degree of an enormous amount of flows can be specifically monitored. Generation of flows in a network is largely non-uniform. For example, a traffic distribution for the amount of transfer demonstrates that a few percent of the total flows constitute more than half of the whole traffic (see Non-patent Document 2). Moreover, it is reported that flows constituting the major portion of the amount of traffic (referred to as "elephant flows" hereinbelow) are highly correlated with the throughput. Thus, by giving an appropriate importance degree to such a non-uniform distribution and creating the table for managing a smaller number of pieces of flow information to define a monitoring importance degree and cause swapping in the table, a major portion of traffic can be monitored, and computational resources and memory size required to be provided in the apparatus can be reduced.

According to Embodiment 1, the table for determining the importance degree and the table for managing statistic information are separately provided. In contrast, a second embodiment performs determination of the importance degree and management of the statistic information by the same table.

Figure 7:
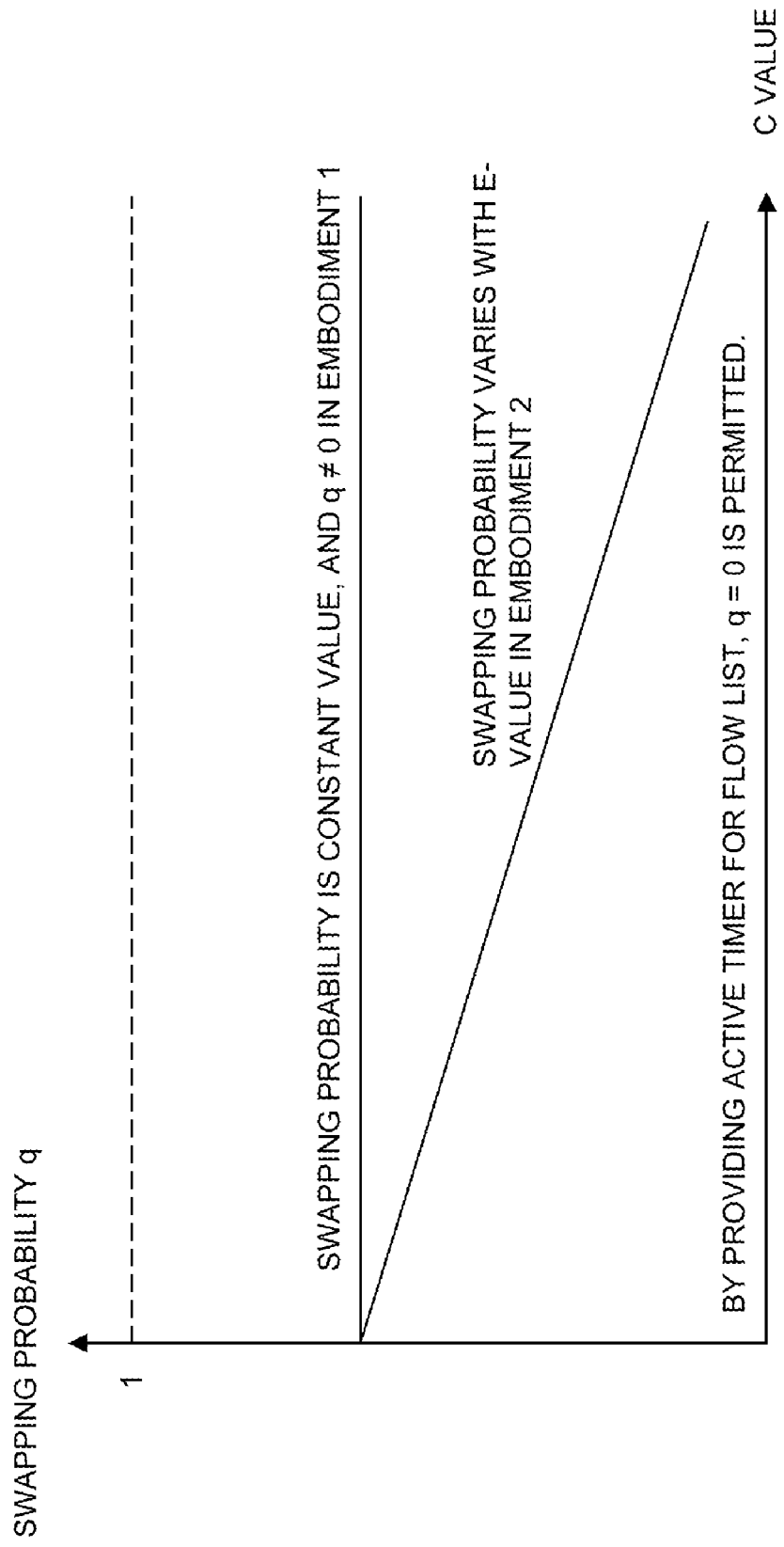
FIG. 7 A diagram explaining a swapping probability for an EZ-list in a second embodiment of the present invention.
Figure 8:
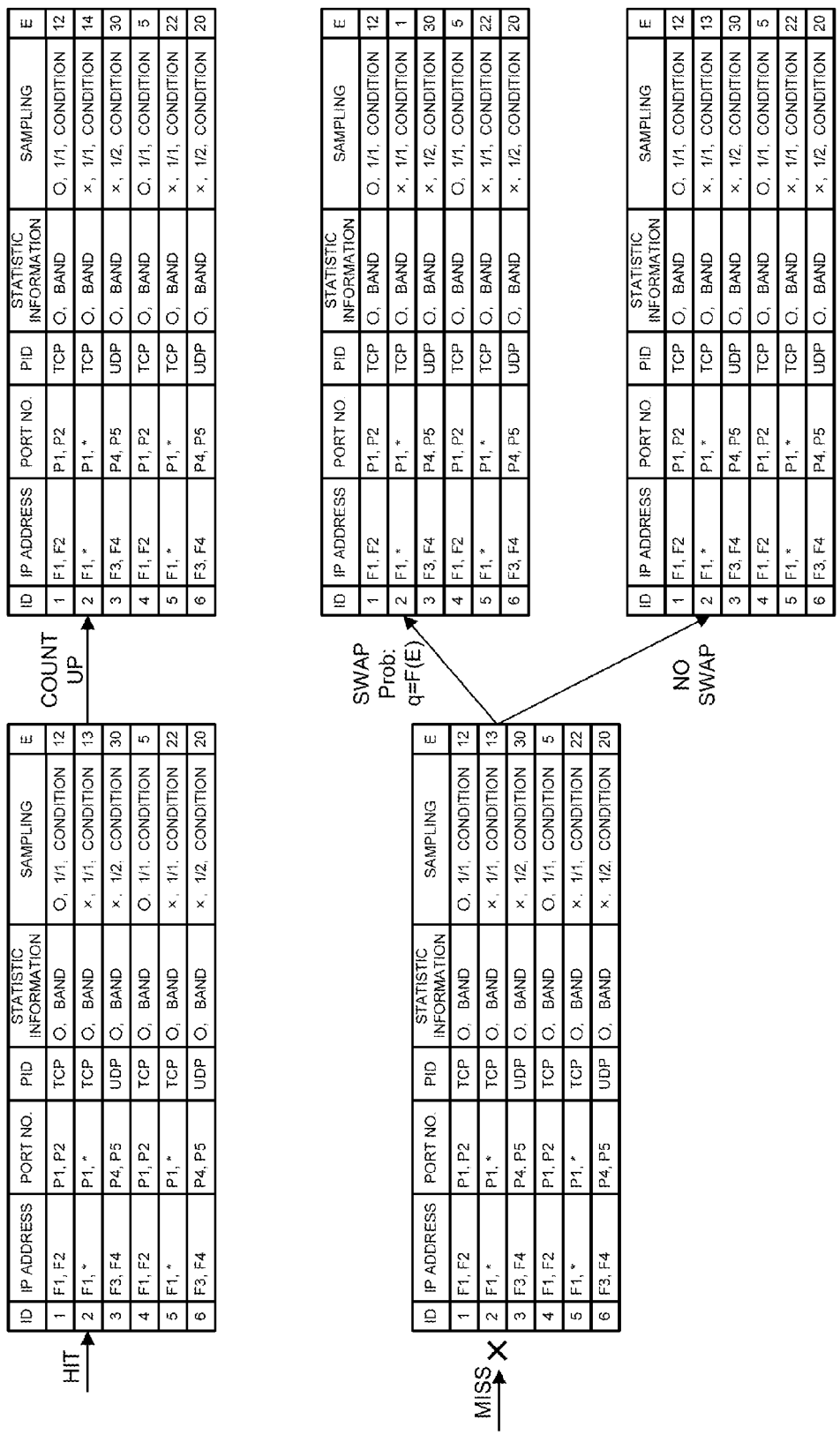
FIG. 8 A diagram showing an overview of registration processing for an E-list and a Z-list.

FIG. 7 is a diagram for explaining a swapping probability in an EZ-list according to a second embodiment of the present invention, and FIG. 8 is a diagram showing an overview of registration processing for the E-list and Z-list.

Similarly to Embodiment 1, a group of packets having the same value in a specific field will be referred to as "flow" in the present embodiment. A specific example of the flow that may be contemplated include a group of packets grouped with reference to one of a transmitting/receiving IP address, a transmitting/receiving port number, a transmitting/receiving MAC address, and a protocol ID, or a combination thereof. Alternatively, packets may be grouped with reference to classification by flag information present in a protocol header according to a protocol such as IP or TCP or priority information present in a protocol header according to a protocol such as IP, VLAN or MPLS, or packets may be grouped with reference to a combination of the foregoing. It may also be contemplated that a method of classification involves using completely identical numbers or types, or a defining a plurality of ranges and classifying those falling within a defined range as the same group.

Figure 9:
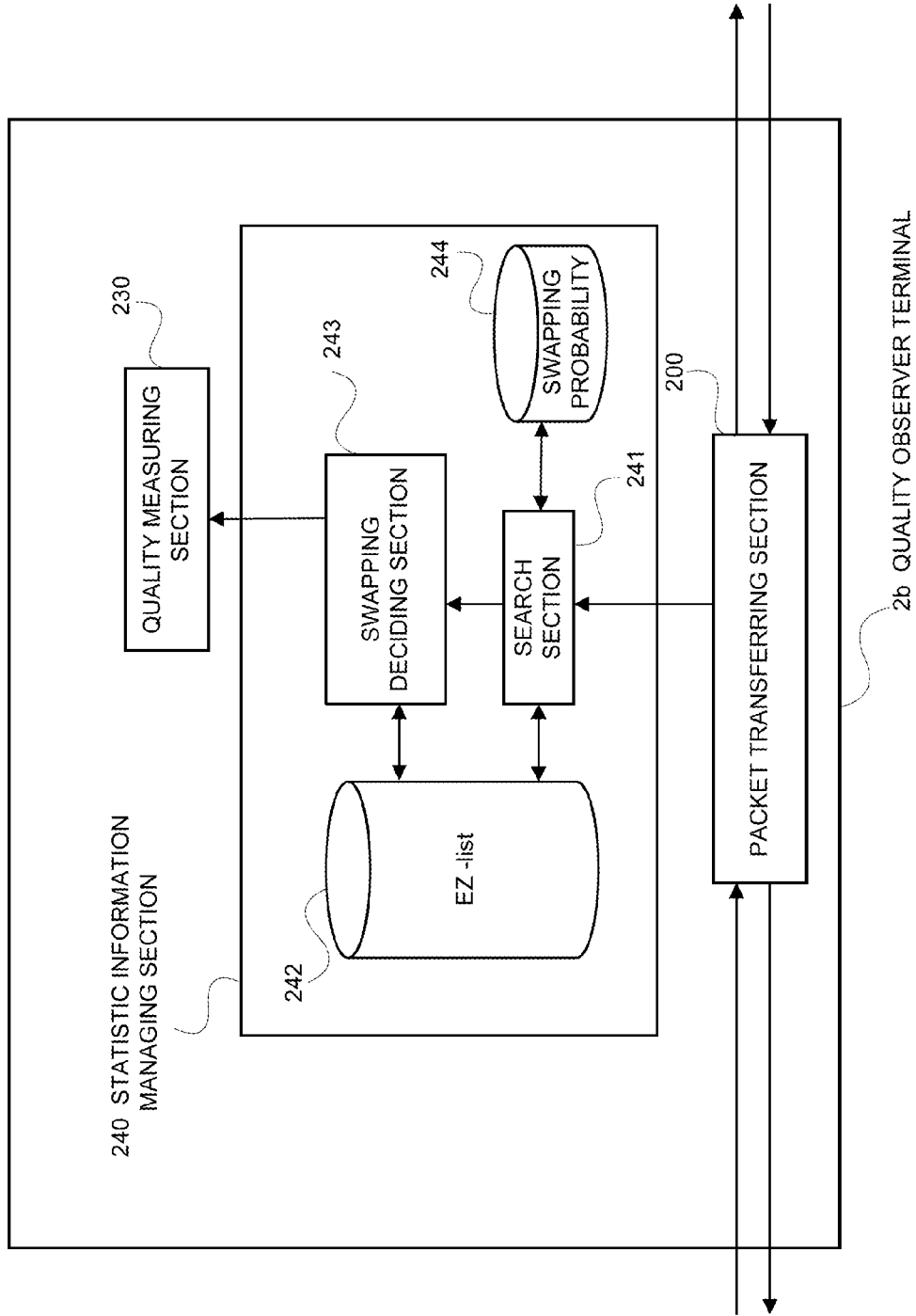
FIG. 9 A block diagram showing a configuration of a quality observer terminal 2b in the second embodiment.

FIG. 9 is a block diagram showing a configuration of the quality observer terminal 2b in the second embodiment, where elements common to those in FIG. 4 representing the first embodiment are designated by common symbols.

The quality observer terminal 2b is comprised of a packet transferring section 200, a quality measuring section 230, and a statistic information managing section 240. The statistic information managing section 240 is comprised of a search section 241 for searching flow information, a swapping probability 244 for delivering a swapping probability to the search section 241, and a swapping deciding section 243 for sending a result of swapping to the quality measuring section 230. The packet transferring section 200 performs processing of observing an incoming packet via an input port into the quality observer terminal 2b, then, sending a result thereof to the statistic information managing section 240, and at the same time, transferring the result via an output port on the other side into the network. The processing is performed each time a packet is input. It should be noted that packets may be sampled and decimated at the packet transferring section 200 and a reduced number of packets may be transferred to the statistic information managing section 240.

The statistic information managing section 240 performs processing at the search section 241 based on the packet information sent by the packet transferring section 200. The search section 241 performs a search on the EZ-list 242. The EZ-list 242 is a list having an ID, a counter value C, and statistic information, and has a parameter representing a swapping probability of the entries. The swapping probability is defined for each counter value C, where the swapping probability for a counter value of one is defined as q1, that for a counter value of two is defined as q2, and that for a counter value of 'n' is defined as qn. This information is stored in the swapping probability 244. In a case that the ID of a flow is found in the EZ-list 242, a counter value C of the corresponding ID is incremented by one, and moreover, managed statistic information including the amount of traffic, packet loss count, flag counts, etc. are updated. In a case that the ID of the flow is not found in the EZ-list 242, an ID in the EZ-list 242 is randomly selected, and the counter value counted for that entry is read. The swapping probability 244 is searched based on the counter value, a swapping probability qn is calculated to generate a random number, and in a case that a result of random number generation is smaller than the swapping probability qn, an entry having the selected ID is dislodged from the EZ-list 242, the packet that has currently arrived is registered in an entry, and a counter value of one is selected. In a case that the result of random number generation is greater than the swapping probability qn, no processing is applied to the EZ-list 242.

When the swapping probability is set as shown in FIG. 7, the rate can be estimated according to the equation EQ. (2) below. In EQ. (2), p designates an average hit rate in the EZ-list, q designates a swapping probability for the EZ-list, Ci designates a counter value C assigned to a flow that was dislodged when swapping occurred, and M designates the size of entries. Thus, calculation of the rate according to EQ. (2) is performed when a packet in another flow, rather than that in the same flow, arrives.

$$(1-p)\cdot(q1/M)\cdot(Ci-1) < Ri < (1-p)\cdot(qn/M)\cdot(Ci-1) \quad (2)$$

While the swapping probability is set as a lower value for a larger counter value in the example shown in FIG. 7, it may be set as a higher value for a larger counter value. Moreover, while a change is linear in FIG. 7, any general function including a non-linear function, a segmentally varying function, a function having a constant term, etc. may be employed.

The swapping deciding section 243 applies no processing when a result at the search section 241 represents update of the EZ-list 242 (increment of the counter). In a case that the EZ-list 242 is not updated but swapping occurs, statistic information for the dislodged flow is sent to the quality measuring section 230. In a case that no swapping occurs, the packet information is sent to the quality measuring section 230. While the present embodiment is described as being used in the environment as shown in FIG. 1 because description is made on a configuration in which the quality observer terminal 2*b* is inserted in a line in a network, packets may be observed by inserting a TAP for copying packets into a network, or by setting a mirror port function of copying packets at a router or a port serving as a switch, as shown in FIG. 6. In the latter case, the packet transferring section 200 in FIG. 9 has a function of receiving packets from the outside of the quality observer terminal 2*b*.

Moreover, while the statistic information managing section 240 and quality measuring section 230 are all provided in one apparatus represented by the quality observer terminal 2*b* in the present embodiment, they may be disposed in separate apparatuses, in which case information transmission among several sections is achieved via a network. Furthermore, while information that is not counted in the EZ-list at the swapping deciding section 243 is described as being sent to the quality measuring section 230 as packet information in the present embodiment, only information that is registered in the EZ-list and that is important may be sent as statistic information. In addition, while the swapping probability in the EZ-list 242 is managed in the swapping probability 244 and read by the search section 241 in the present embodiment, it may be written in the EZ-list 242 or calculated at the search section 241 every time based on the counter value.

Figure 10:
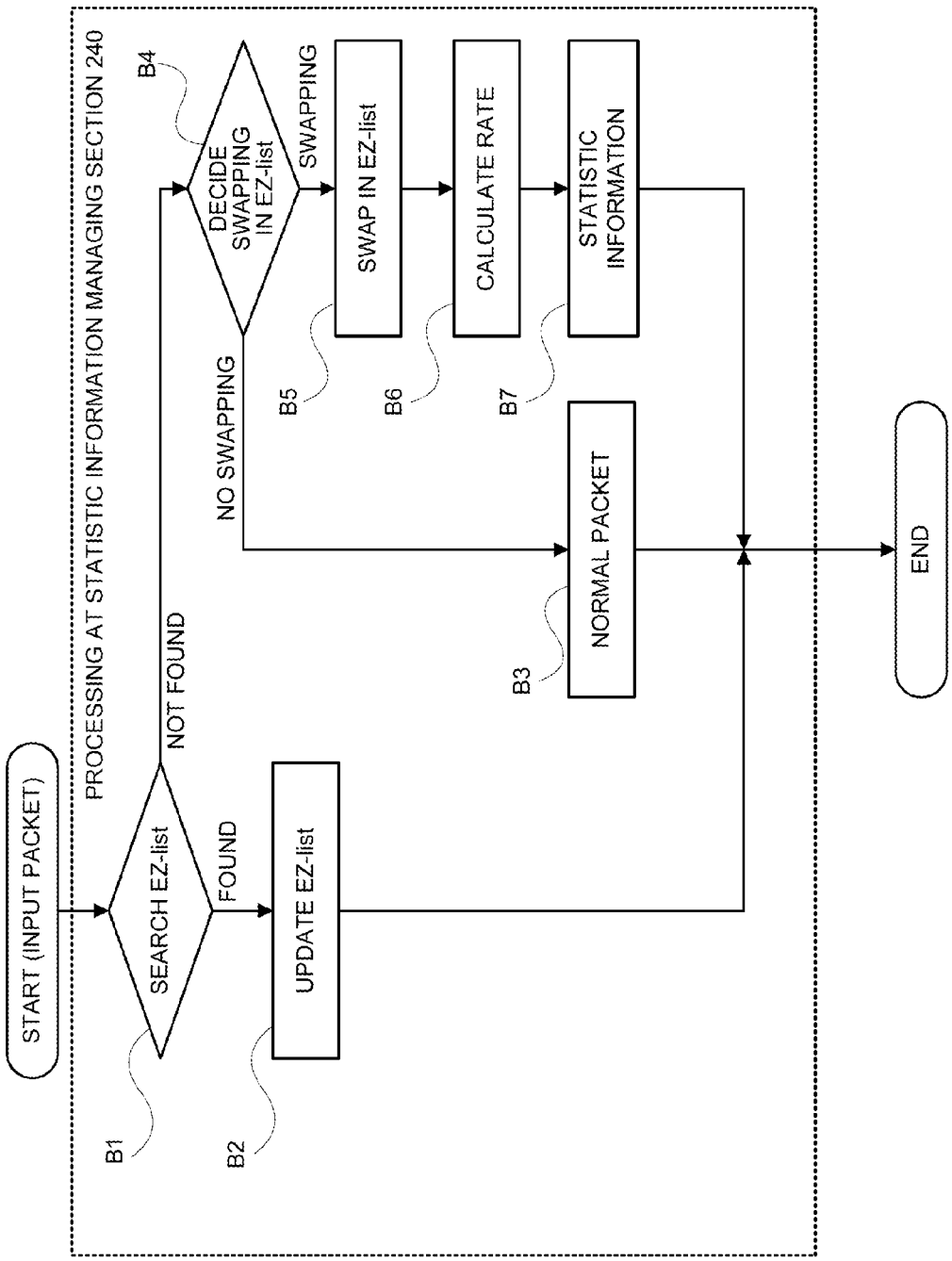
FIG. 10 A flow chart for explaining an operation of a statistic information managing section 240 in the quality observer terminal 2b.

FIG. 10 is a flow chart showing an operation of the statistic information managing section 240 in the quality observer terminal 2*b*.

Processing of a method of swapping in a statistic information management table used in the quality observer terminal 2*b* in this example will be described hereinbelow with reference to FIG. 10.

As soon as a packet arrives at the packet transferring section 200, its content is transferred to the search section 241 to start processing, and the process goes to Step B1. At Step B1, the search section 241 searches the EZ-list 242 to check whether a flow for a packet under processing is registered in the EZ-list 242, and in a case that the flow is registered, the process goes to Step B2; otherwise, to Step B4. At Step B2, the EZ-list 242 undergoes update processing. In particular, a counter value in the EZ-list 242 is incremented by one. Then, the managed statistic information including the amount of traffic, packet loss count, flag counts, etc. are updated, and the processing is terminated. At Step B3, the packet information sent by the packet transfer 220 is sent to the quality deciding section 230, and the processing is terminated.

At Step B4, swapping decision is performed for the EZ-list 242. The swapping decision is executed at the search section 241. Initially, an entry in the EZ-list 242 is randomly selected and its counter value is read. The swapping probability 244 is searched from a result thereof, and a swapping probability qn is read. The search section 241 then generates a random number, compares it with the swapping probability qn, and in a case that the swapping probability qn is higher, swapping processing occurs and the process goes to Step B5, or in a case that the swapping probability qn is lower, the process goes to Step B3. At Step B5, swapping of entry information is performed. The entry information selected at Step B4 is dislodged from the EZ-list 242, and an entry of the flow under processing is created. In this new registration, the counter value is set to one and the statistic information is cleared. After the processing, the process goes to Step B6. At Step B6, rate calculation for the dislodged flow is performed using EQ. (2) based on the counter value at the time of swapping. The process then goes to Step B7. At Step B7, the information for the entry dislodged from the EZ-list 242 at Processing A4 is sent to the quality measuring section 230, and the processing is terminated.

As described above, according to the second embodiment, a swapping probability of an entry managed in the table may be modified, and then, a flow likely to remain in the table for a longer period of time and that likely to remain for a shorter period of time are stochastically provided. By defining a flow desired to be monitored as that likely to remain in the table for a longer period of time stochastically, statistic information for a flow with a higher importance degree can be specifically monitored. For example, by defining a lower swapping probability for a higher counter value, a flow with a higher rate is likely to lodge in the table for a longer period of time, while that with a lower rate is likely to be dislodged from the table earlier. Thus, by setting the swapping probability such that a flow remains in the table for a longer period of time while taking account of its monitoring importance degree, a table having a smaller number of entries may be used to efficiently monitor important information, and computational resources and memory size required to be provided in the apparatus can be reduced.

Figure 11:
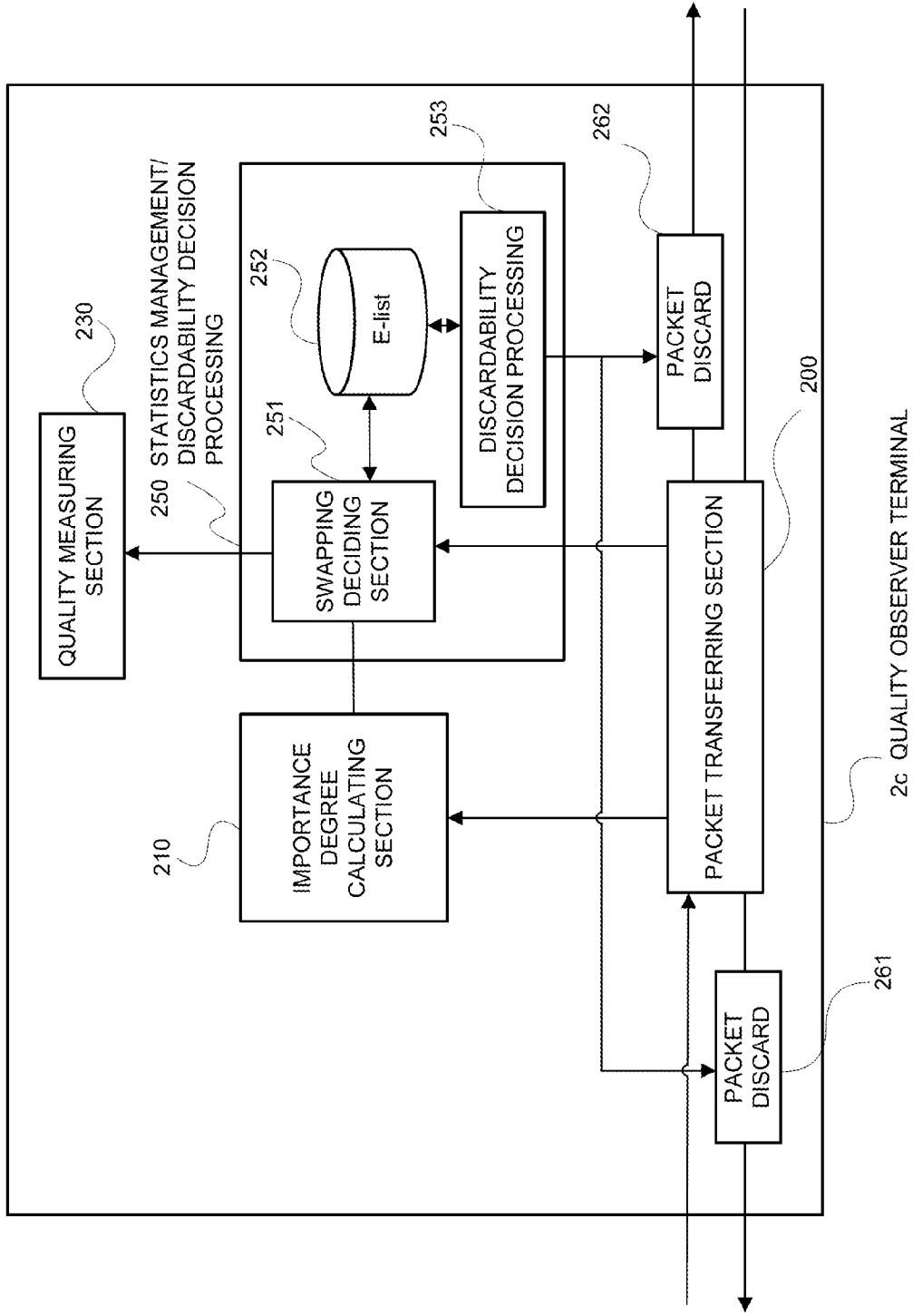
FIG. 11 A block diagram showing a configuration of a quality observer terminal representing a third embodiment of the present invention.

FIG. 11 is a block diagram showing a configuration of a quality observer terminal representing a third embodiment of the present invention.

According to the first and second embodiments, network quality is measured by a table for concentratedly monitoring flows with a higher monitoring importance degree. In contrast, according to the third embodiment, a similar table is employed in measurement, and from a result thereof, packet discardability decision processing is performed to control packets transferred from the packet transferring section 200.

The quality observer terminal 2c in this example is comprised of a packet transferring section 200, an importance degree calculating section 210, a quality measuring section 230, statistics management/discardability decision processing 250, and packet discard 261, 262, as shown in FIG. 11. The statistics management/discardability decision processing 250 is comprised of a swapping deciding section 251 for deciding swapping from the importance degree of a current flow and that in an E-list, an E-list 252 in which statistic data for flows having a high monitoring importance degree are stored, and discardability decision processing 253 for performing discardability decision on a packet. The packet discard 261, 262 perform packet discard processing.

The packet transferring section 200 performs processing of observing an incoming packet via an input port into the quality observer terminal 2c, then, sending a result thereof to the importance degree calculating section 210 and statistics management/discardability decision processing 250, and at the same time, transferring the result via an output port on the other side into the network. The processing is performed each time a packet is input. It should be noted that packets may be sampled and decimated at the packet transferring section 200 and a reduced number of packets may be transferred to the importance degree calculating section 210 and statistics management/discardability decision processing 250. The processing at the importance degree calculating section 210 is similar to that in the first embodiment. At the statistics management/discardability decision processing 250, the packet information from the packet transferring section 200 and the importance degree calculated at the importance degree calculating section 210 are input. The swapping deciding section 251 decides processing based on the contents in the E-list 252, a result of the importance degree calculating section 210, and the packet information from the packet transferring section 200. The E-list 252 is a list having a flow ID, an importance degree E-value, and statistic information (the amount of traffic, packet loss count, flag counts, etc.) forming a set. Moreover, the swapping deciding section 251 stores therein a flow ID that has the lowest importance degree in the E-list 252 and its importance degree E-value. The E-value of the lowest importance degree that is stored there will be referred to as "Emin" hereinbelow.

In a case that a packet from the packet transferring section 200 belongs to a flow not registered in the E-list 252 and also not registered in the Z-list 212, the packet information is sent to the quality measuring section 230 without applying any action. At that time, packets may be sampled and sent at a certain probability. In a case that a packet from the transferring section 200 belongs to a flow not registered in the E-list 252 but registered in the Z-list 212, the priority F in the Z-list 212 after increment is compared with the value of Emin, and in a case that the priority F is greater than Emin, information on the flow having Emin is deleted from the E-list 222, and the registered importance degree E and statistic information are sent to the quality measuring section 230. Then, the entry for the current flow is registered in the E-list 252. In registering an entry, the flow information for the group is registered in the flow ID, the importance degree E-value is blank, and the statistic information is cleared (the amount of traffic, packet loss count, flag counts, etc. are set to zero). In a case that the priority F is lower than Emin, the packet information is sent to the quality measuring section 230 without modifying the E-list 252.

In a case that a packet from the packet transferring section 200 belongs to a flow registered in the E-list 252 but not registered in the Z-list 212, and when no swapping occurs in the Z-list 212 according to the result at the search section 211, the registered statistic information is updated in the E-list 252. However, before updating the information, the discardability decision processing 251 decides whether the current packet should be transferred or discarded at the present apparatus. Since detailed information can be collected for a flow entered in the statistic information, a method of deciding discardability by stochastically discarding a corresponding packet or discarding all packets when the amount of traffic reaches a certain value or when a connect time reaches a certain time, while taking account of fairness with other flows may be contemplated.

In a case that the packet is decided to be discarded, the statistic information in the E-list 252 is not updated and data transfer from the swapping deciding section 251 to the quality measuring section 230 is not performed. When swapping occurs in the Z-list 212 according to a result at the search section 211, statistic information for a flow to which the packet under processing belongs is updated, and at the same time, the processing decision is made on the flow dislodged due to changing in the Z-list 212. In a case that the dislodged flow is also found in the E-list 252, the counter value C at the time of dislodgment from the Z-list 212 is used to calculate a final importance degree F., and the information is written as an importance degree E in the statistic information in the E-list 222 (which corresponds to time C and time E in FIG. 3). In a case that the flow dislodged from the Z-list 212 is not found in the E-list 222, no processing is applied.

In a case that a packet from the packet transferring section 200 belongs to a flow registered in the E-list 252 and also registered in the Z-list 212, the Z-list 212 is updated, and at the same time, the E-list 222 is updated. However, before updating the information, the discardability decision processing 251 decides whether the current packet should be transferred or discarded at the quality observer terminal 2c. Since detailed information can be collected for a flow entered in the statistic information, a method of deciding discardability by stochastically discarding a corresponding packet or discarding all packets when the amount of traffic reaches a certain value or when a connect time reaches a certain time, while taking account of fairness with other flows may be contemplated. In a case that the packet is decided to be discarded, the statistic information in the E-list 252 is not updated and data transfer from the swapping deciding section 251 to the quality measuring section 230 is not performed. The processing at the quality measuring section 230 is similar to that in the first embodiment. A packet decided to be discarded at the packet discard 251 is discarded at the packet discard 261 or 262.

While the importance degree calculating section 210, statistics management/discardability decision processing 250, quality measuring section 230, packet discard 261, and packet discard 262 are all provided in one apparatus represented by the quality observer terminal 2c in the present embodiment, they may be disposed in separate apparatuses, in which case information transmission among several sections is achieved via a network. Moreover, while information that is not counted in the E-list at the swapping deciding section 251 is described as being sent to the quality measuring section 230 as packet information in the present embodiment, only information that is registered in the E-list and that is important may be sent as statistic information. Furthermore, while packet information observed in the packet transferring section 200 is described as being simultaneously sent to the importance degree calculating section 210 and statistics management/discardability decision processing 250 in the present embodiment, it may be sent to the importance degree calculating section 210, and the packet information per se may be sent along with an importance degree of a flow from the importance degree calculating section 210 to the statistics management/discardability decision processing 250.

Moreover, while flow swapping is described with reference to a case in which packet observation is performed at the packet transferring section 200 in the present embodiment, a method of activating an active timer (operating at regular intervals even information is updated) or an inactive timer (operating after a certain period of time from the time at which update of information is stopped) for each entry of statistic information in the E-list 252, and sending the statistic information to the quality measuring section 230 may be contemplated. At that time, a method of sending information and deleting it from the E-list 252, or a method of sending information without deleting it may be contemplated. In a case that information is deleted from the E-list 252, it may be contemplated that an importance degree is set as a low value, such as, for example, zero, so that a next flow may immediately fill the entry.

Figure 12:
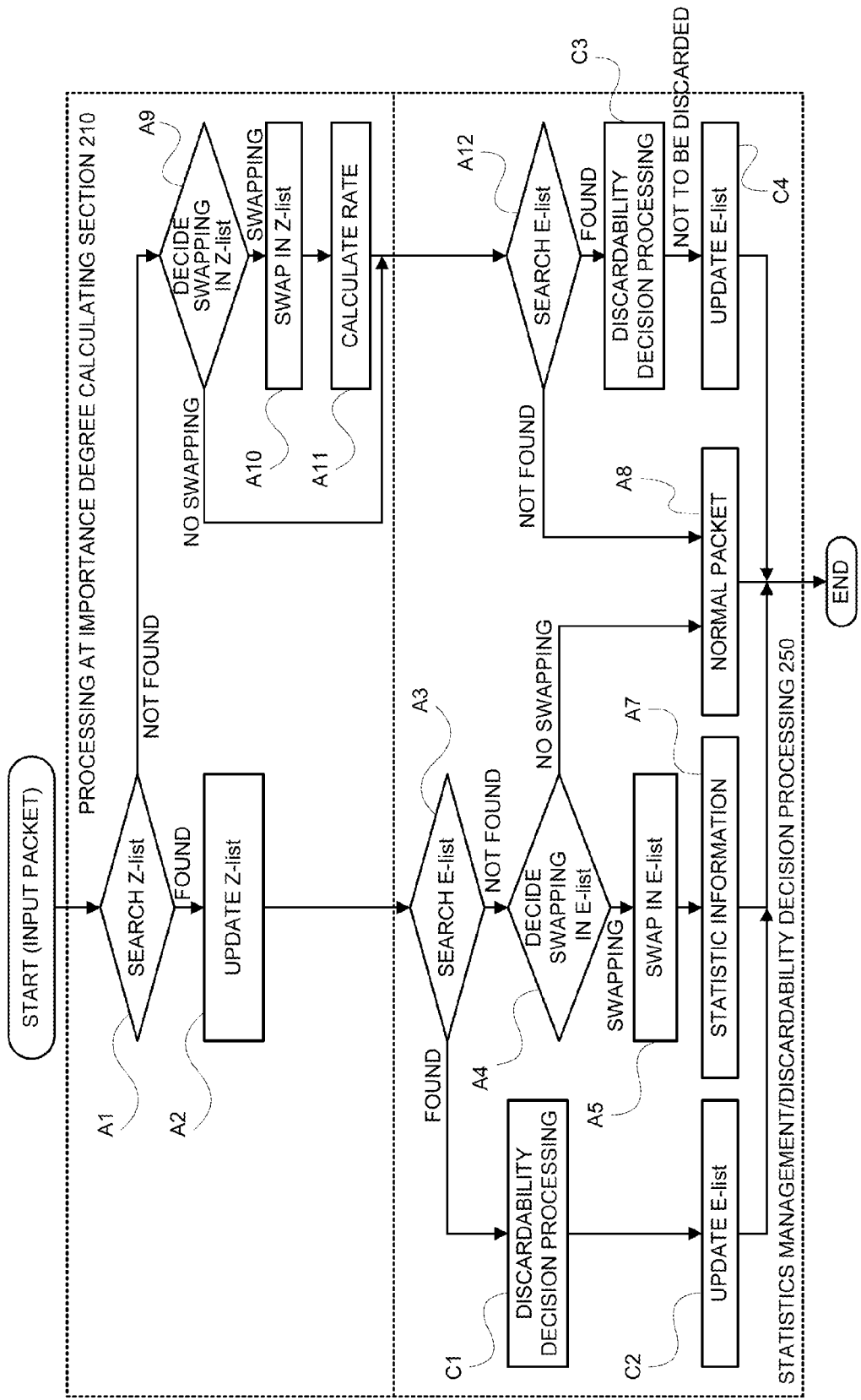
FIG. 12 A flow chart for explaining an operation of an importance degree calculating section 210 and statistics management/discardability decision processing 250 in the quality observer terminal 2c.

FIG. 12 is a flow chart for explaining an operation of the importance degree calculating section 210 and statistics management/discardability decision processing 250 in the quality observer terminal 2c.

Processing of a method of swapping in a statistic information management table used in the quality observer terminal 2c in this example will be described hereinbelow with reference to FIG. 12.

As soon as a packet arrives at the packet transferring section 200, its content is transferred to the search section 211 and the swapping deciding section 221 to start processing, and the process goes to Step A1. At Step A1, the search section 211 searches the Z-list 212 to check whether a flow for the packet under processing is registered in the Z-list 212; in a case that the flow is registered, the process goes to Step A2; otherwise, to Step A9. At Step A2, the Z-list 212 undergoes update processing. In particular, a counter value in the Z-list 212 is incremented by one. Then, the importance degree determining section 213 calculates a temporary importance degree F. for the flow whose counter is incremented (the final importance degree is determined when a corresponding flow is dislodged from the Z-list 212). After completion of the processing, the process goes to Step A3.

At Step A3, the swapping deciding section 221 searches the E-list 252 as to whether a flow to which the packet sent by the packet transferring section 200 belongs is found there. In a case that the flow is found in the E-list 252, the process goes to Step C1; otherwise, to Step A4. At Step A4, the value Emin that is the lowest importance degree in the E-list 252 is compared with the temporary importance degree F. for the flow whose counter is incremented in the Z-list 212 under updating. In a case that the importance degree F. is higher than Emin, swapping occurs in the E-list 252, and the process goes to Step A5. In a case that Emin is higher than the importance degree F., no swapping occurs, and the process goes to Step A8. At Step A5, the flow associated with Emin is dislodged from the E-list 252, an entry of the flow to which the packet under processing belongs is created. At that time, the statistic information is in a cleared state and the importance degree is left blank, and the process goes to Step A7. At Step A7, information for the entry dislodged from the E-list 252 at Step A5 is sent to the quality measuring section 230, and the processing is terminated.

At Step A8, the packet information sent by the packet transfer 220 to the swapping deciding section 221 is sent to the quality deciding section 230. At Step A9, swapping decision processing for the Z-list 212 is performed, a random number is generated for comparison with the swapping probability q present in the Z-list 212, and in a case that the swapping probability q is larger, swapping processing occurs and the process goes to Step A10, or in a case that the swapping probability q is lower, the process goes to Step A12. At Step A10, swapping processing in the Z-list 212 is performed. An entry in the Z-list 212 is randomly selected and dislodged from the Z-list 212, and information belonging to the information for the packet under processing is written into the entry. The ID is written with that of a flow to which the packet under processing belongs, and the counter value C is recorded with one. Thereafter, the process goes to Step A11.

At Step A11, the importance degree determining section 213 calculates a rate according to EQ. (1) from the counter value C of the flow for which swapping has occurred at Step A9, to calculate an importance degree F. for the flow based on a result thereof. In a case that the flow is found in the E-list 222, the importance degree F. for the flow is written into the importance degree E in the E-list 252, and the process goes to Step A12. At Step A12, the swapping deciding section 221 searches the E-list 252. When there is found the flow under processing, the process goes to Step C3; otherwise, to Step A8. At Step C1, discardability decision processing is performed at the discardability decision processing 253. The packet discardability is decided by looking up the statistic information registered in the E-list 252, and the decision is made based on a criterion that a certain amount of traffic is reached or a connection lasts for a certain period of time. In a case that a packet should be discarded, a command of packet discard is delivered to the packet discard 261 or 262. The process then goes to Step C2. At Step C2, statistic information in the E-list 252 is updated and the processing is terminated. At Step C3, processing similar to that at Step C1 is performed. After completion of the processing, the process goes to Step C4. At Step C4, processing similar to that at Step C2 is performed.

According to the present embodiment, the entry managed in a table, or a flow, is given an importance degree for monitoring. Specifically, according to the present embodiment, a throughput stochastically calculated using a small table is defined as the monitoring importance degree. Since swapping occurs in the table based on the importance degree, statistic information for those having a higher importance degree of an enormous amount of flows can be specifically monitored. Generation of flows in a network is largely non-uniform. For example, a traffic distribution for the amount of transfer demonstrates that a few percent of total flows constitute more than half of the whole traffic (see Non-patent Document 2). Moreover, it is reported that flows constituting the major portion of the traffic (elephant flows) are highly correlated with the throughput. Thus, by giving an appropriate importance degree to such a non-uniform distribution and creating the table for managing a smaller number of pieces of flow information to define a monitoring importance degree and cause swapping in the table, a major portion of traffic can be monitored, and computational resources and memory size required to be provided in the apparatus can be reduced. In addition, by classifying the property of a flow into an amount of traffic and a throughput, flows can be simply classified into those with low rate and low traffic, those with low rate and high traffic, those with high rate and low traffic, and those with high rate and high traffic. Although similar control is applied both to flows with high rate and low traffic and those with high rate and high traffic when traffic control with a conventional rate is applied, it may be contemplated here to use a method involving performing concentrated monitoring on flows with high rate while acquiring their statistic information, and performing packet discard after the amount of traffic has reached a great value.

The present invention may be applied to a wide range of apparatuses for managing communication quality of a network.

The invention claimed is:

1. A node apparatus for observing communication quality of a network, comprising:
   packet observer for observing packets flowing through the network;
   packet classifying unit for looking up a specific field in a packet observed by said packet observer, and classifying said packet in accordance with a type of said field;
   monitoring importance degree calculator for calculating a monitoring importance degree for each type of packets classified by said packet classifying unit; and
   statistic information manager provided with a statistic information management table for managing statistic information on communication quality of a network, for searching said statistic information, and in a case that said statistic information has been created, updating said statistic information, or in a case that said statistic information has not been created, deciding whether swapping should occur in said statistic information management table based on said monitoring importance degree.

2. A node apparatus according to claim 1, wherein said packet observer uses part of packets passing through said network as a target of observation.

3. A node apparatus according to claim 1, wherein said monitoring importance degree calculator calculates the ratio or number of arrivals of a class based on a history of packets that arrived in the past, and calculates said monitoring importance degree based on a result of the calculation.

4. A node apparatus according to claim 1, wherein said monitoring importance degree calculator comprises a table in which a history of packets that arrived in the past is stored, and calculates the ratio or number of arrivals of said class of packets by searching for the presence of said class of packets in said history of packets.

5. A node apparatus according to claim 1, wherein said monitoring importance degree calculator comprises a table in which a history of packets that arrived in the past is stored and which contains as its entry a flow ID for registering an identifier of a flow, and a number of times of updating or looking up of the entry.

6. A node apparatus according to claim 1, wherein said statistic information manager has either one of the counter value or monitoring importance degree as one piece of entry information in said statistic information management table, and in a case that a packet that has arrived is found in said statistic information management table, updates statistic information for a corresponding class, or in a case that the packet is not found in said statistic information management table, newly registers the packet that has arrived based on the counter value or monitoring importance degree in said entry information, and dislodges a registered entry information from the table.

7. A node apparatus according to claim 1, wherein, when a class of a packet that has arrived is not found in said statistic information management table, said statistic information manager selects an entry in said statistic information table, and determines a swapping probability for the entry based on the monitoring importance degree written in the entry.

8. A method of swapping in a statistic information management table for use in a node apparatus for observing communication quality of a network, comprising:
   a packet observing step of observing packets flowing through the network;
   a packet classifying step of looking up a specific field in a packet observed by said packet observing processing, and classifying said packet in accordance with a type of said field;
   a monitoring importance degree calculating step of calculating a monitoring importance degree for each type of packets classified by said packet classifying processing; and
   a statistic information managing step of providing a statistic information management table for managing statistic information on communication quality of a network, searching said statistic information, and in a case that said statistic information has been created, updating said statistic information, or in a case that said statistic information has not been created, deciding whether swapping should occur in the statistic information management table based on said monitoring importance degree.

9. A method of swapping in a statistic information management table according to claim 8, wherein said packet observing step uses part of packets passing through said network as a target of observation.

10. A method of swapping in a statistic information management table according to claim 8, wherein said monitoring importance degree calculating step comprises calculating the ratio or number of arrivals of a class based on a history of packets that arrived in the past, and calculating said monitoring importance degree based on a result of the calculation.

11. A method of swapping in a statistic information management table according to claim 8, wherein said monitoring importance degree calculating step is configured to comprise a table in which a history of packets that arrived in the past is stored, and calculate the ratio or number of arrivals of said class of packets by searching for the presence of said class of packets in said history of packets.

12. A method of swapping in a statistic information management table according to claim 8, wherein said monitoring importance degree calculating step comprises a table in which a history of packets that arrived in the past is stored and which contains as its entry a flow ID for registering an identifier of a flow, and a number of times of updating or looking up of the entry.

13. A method of swapping in a statistic information management table according to claim 8, wherein said statistic information managing step has either one of the counter value or monitoring importance degree as one piece of entry information in said statistic information management table, and in a case that a packet that has arrived is found in said statistic information management table, updates statistic information for a corresponding class, or in a case that the packet is not found in said statistic information management table, newly registers the packet that has arrived based on the counter value or monitoring importance degree in said entry information, and dislodges a registered entry information from the table.

14. A method of swapping in a statistic information management table according to claim 8, wherein, when a class of a packet that has arrived is not found in said statistic information management table, said statistic information managing step comprises selecting an entry in said statistic information table, and determining a swapping probability for the entry based on the monitoring importance degree written in the entry.

15. A communication system for observing communication quality of a network, comprising:
   packet observing unit for observing packets flowing through the network;
   packet classifying unit for looking up a specific field in a packet observed by said packet observing unit, and classifying said packet in accordance with a type of said field;
   monitoring importance degree calculating unit for calculating a monitoring importance degree for each type of packets classified by said packet classifying unit; and
   statistic information managing unit provided with a statistic information management table for managing statistic information on communication quality of a network, for searching said statistic information, and in a case that said statistic information has been created, updating said statistic information, or in a case that said statistic information has not been created, deciding whether swapping should occur in said statistic information management table based on said monitoring importance degree.

16. A non-transitory computer readable medium comprising a program for a node apparatus for observing communication quality of a network, wherein said program causes said node apparatus to execute:
   packet observation processing of observing packets flowing through the network;
   packet classification processing of looking up a specific field in a packet observed by said packet observation processing, and classifying said packet in accordance with a type of said field;
   monitoring importance degree calculation processing of calculating a monitoring importance degree for each type of packets classified by said packet classification processing; and
   statistic information management processing of providing a statistic information management table for managing statistic information on communication quality of a network, searching said statistic information, and in a case that said statistic information has been created, updating said statistic information, or in a case that said statistic information has not been created, deciding whether swapping should occur in the statistic information management table based on said monitoring importance degree.

* * * * *